United States Patent Office 3,387,431
Patented June 11, 1968

3,387,431
DESULFURIZING OF WATER
Gerald H. Siebert, 4802 Black Road,
Monclova, Ohio 43542
Filed June 13, 1966, Ser. No. 557,206
8 Claims. (Cl. 55—51)

ABSTRACT OF THE DISCLOSURE

An apparatus and method for removing an absorbed gas (hydrogen sulfide) from a liquid (water) by projecting a dispersed stream of the liquid into a closed chamber, inducing air to flow with the liquid through a restricted tubular passage in the chamber, directing the air with gas released from the liquid through a return passage to bring the air back to the entrance of the tubular passage to be recirculated with the stream of liquid, and gas removing means (iron oxide) in the return passage to remove the gas from the air.

Figure 1:
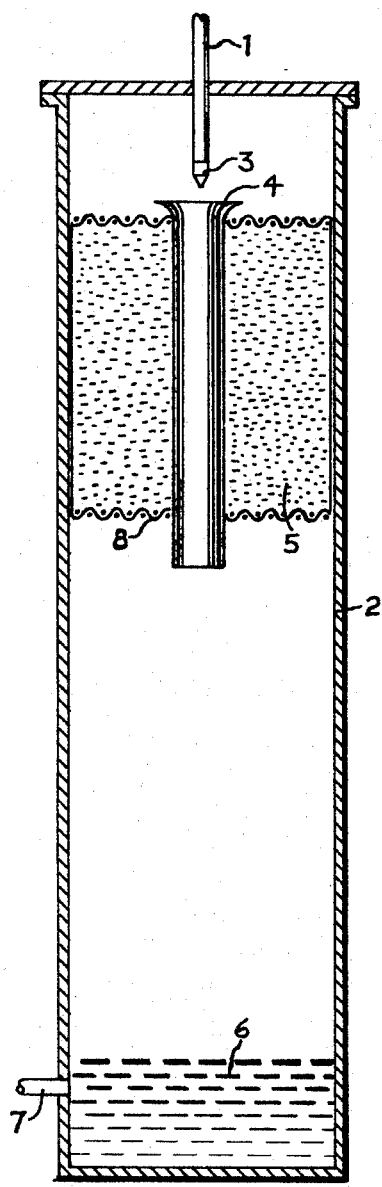

This invention is concerned with a process for the treatment of water containing dissolved hydrogen sulfide, commonly called "sulfur water."

An object of this invention is to provide an improved process for the removal of hydrogen sulfide from water.

It is also an object of this invention to provide a process that is closed from the atmosphere and which alleviates the detrimental effects caused by adding compositions of matter to the hydrogen sulfide laden water to remove hydrogen sulfide.

Water from many wells contains dissolved hydrogen sulfide to such a concentration that the smell and taste of it are very objectionable to drink or use. The hydrogen sulfide also creates a severe corrosion problem in distributing lines and equipment. The process of this invention is concerned with the removal of hydrogen sulfide from water by first dispersing the water in a spray head which facilitates the stripping of hydrogen sulfide from the water and the subsequent reaction of the gaseous hydrogen sulfide in a reactive bed. The gaseous phase is recycled by the action of the dispersed water droplets emitted from the spray head. The process will continue to function at essentially room temperature to the extent to which the reactive bed is capable of removing the gaseous hydrogen sulfide from the recycled gas phase.

The accompanying drawing shows the basic arrangement of the desulfurizer. Water containing dissolved hydrogen sulfide enters the air tight chamber 2 through inlet pipe 1. The water is dispersed by nozzle 3 and passes downward through tubing 4 and falls into reservoir 6. A wire basket 8 serves to contain the reactive bed 5. The desulfurized water exits through outlet pipe 7.

In operation water containing dissolved hydrogen sulfide is pumped under pressure through inlet pipe 1 into the air tight chamber 2 which contains a portion of air. The water in turn passes through a nozzle 3 which disperses it into small droplets and directs the droplets to pass downward through tube 4. The pressure on the inlet water must be sufficient to overcome the internal pressure of the gases inside the chamber 2 and to facilitate the forming of small droplets by the nozzle 3. The droplets emitted from the nozzle travel at sufficient velocity to cause the air in the chamber to travel in parallel flow with the water droplets downward through tube 4. As the droplets travel downward through tube 4, the hydrogen sulfide is stripped from the water droplets due to a concentration driving force. The liberated gaseous hydrogen sulfide and air mixture then turns and travels upward through the reactive bed 5 due to a pressure gradient. As the gaseous mixture travels upward through the reactive bed, the hydrogen sulfide will react with the bed leaving only air to exit from the top of the bed. The air free of hydrogen sulfide is then ready to start another cycle at the entrance of the tube 4. The water droplets emitted from the bottom of tube 4 continue in a downward direction to collect and form the reservoir 6. Water, essentially free of hydrogen sulfide, can be tapped off through outlet pipe 7.

As an example of the typical operation of the desulfurizer, water containing one grain of hydrogen sulfide per gallon enters the desulfurizer with 10 p.s.i. differential between the inlet pressure and the pressure of the air in the desulfurizer. Five solid cone nozzles inclined from the normal disperse the inlet water stream into essentially a cylindrical column of small droplets. Due to the Bernoulli effect created by the nozzles, air will be forced to travel in parallel flow with the droplets through a 4-inch tube that contains them. The tube is of sufficient length to maintain an impervious barrier between the reactive bed of iron oxide and the column of water droplets. The reactive bed consists of iron turnings that have been oxidized to form an outer coating of iron oxide. The unoxidized inner core of the iron turnings prevents densification of the bed and allows for ease of flow of air and hydrogen sulfide mixture through it. The desulfurizing process will continue to function at room temperature until the iron oxide bed is no longer able to remove the hydrogen sulfide gas passing through it. The bed can be regenerated for continued use by heating it to approximately 900 degrees Fahrenheit with an ample supply of oxygen until all the sulfur is burnt off.

The above process provides a number of advantages such as essential hydrogen sulfide free water, a large latitude of operating variables, and the desulfurizer can simultaneously function as a pneumatic water supply tank.

While iron oxide surfaces of iron turnings is the preferred reactive substance of the reactive bed, other oxides such as those of zinc, calcium and magnesium may be utilized.

Where "air" appears in the claims, it should be interpreted sufficiently broadly to encompass air of which components have been augmented or depleted, as the action of the subject process adds hydrogen sulfide to the air and may disturb the natural content of oxygen. Nitrogen the principal ingredient of atmospheric air would alone be entirely serviceable.

I claim:
1. Apparatus for removing an absorbed gas from a liquid which includes a generally closed chamber, means for projecting a dispersed stream of liquid carrying an absorbed gas under pressure into the chamber, means providing an outlet for the liquid from the chamber, means providing an open-ended restricted passage for the stream of liquid within the chamber, said restricted passage being so shaped and positioned that the stream of liquid aspirates air from the chamber to travel with the dispersed stream of liquid through the restricted passage and to mix with the liquid so that said absorbed gas is released from the liquid into the accompanying air, means providing a return passage exteriorly of the restricted passage for the return of the air from the outlet to the inlet of the restricted passage whereby the air is recirculated, and means in said return passage adapted to remove the released gas from the air.

2. Apparatus according to claim 1 in which the means for projecting said dispersed stream of liquid is at the upper end of the chamber, the means providing an open-ended restricted passage comprises a vertically extending tubular member, and the return passage is positioned laterally of the tubular member.

3. Apparatus according to claim 2 in which the means in the return passage adapted to remove the gas from the air includes a metallic oxide chemically reactive in relation to the gas.

4. A process for removing an absorbed gas from a liquid which comprises projecting a dispersed stream of liquid carrying an absorbed gas under pressure into a generally closed chamber having an outlet for the liquid from the chamber and an open-ended restricted passage for the dispersed stream of liquid within the chamber, said dispersed stream of liquid aspirating gaseous medium within the chamber to travel with the dispersed stream of liquid through the restricted passage and mixing with the liquid so that the absorbed gas is released from the liquid into the accompanying gaseous medium, returning the gaseous medium from the outlet to the inlet of the restricted passage to recirculate the gaseous medium and removing from the gaseous medium the released gas carried by the gaseous medium during the return movement of the gaseous medium.

5. The process according to claim 4 wherein the gaseous medium is air.

6. A process according to claim 4 adapted particularly for the removal of hydrogen sulfide from water in which the removal from the gaseous medium of the hydrogen sulfide is effected by passing the gaseous medium through a reactive bed.

7. The process according to claim 6 wherein the reactive bed includes a metallic oxide.

8. The process according to claim 7 wherein the metallic oxide includes iron oxide.

References Cited

UNITED STATES PATENTS 2,141,349  12/1938  Engelhardt _____ 23—206

FOREIGN PATENTS 867,473  5/1961  Great Britain.
909,108  10/1962  Great Britain.

REUBEN FRIEDMAN, *Primary Examiner.*

R. W. BURKS, *Assistant Examiner.*